(12) United States Patent
Crouse et al.

(10) Patent No.: US 7,443,113 B2
(45) Date of Patent: Oct. 28, 2008

(54) SOFTWARE CONTROLLED ELECTRONIC DIMMING BALLAST

(75) Inventors: Kent Crouse, Carpentersville, IL (US); William Keith, Lake in the Hills, IL (US); George Grouev, Arlington Heights, IL (US)

(73) Assignee: Universal Lighting Technologies, Inc., Madison, AL (US)

( * ) Notice: Subject to any disclaimer, the term of this patent is extended or adjusted under 35 U.S.C. 154(b) by 581 days.

(21) Appl. No.: 10/726,018

(22) Filed: Dec. 2, 2003

(65) Prior Publication Data

US 2006/0175983 A1    Aug. 10, 2006

(51) Int. Cl.
    *G05F 1/00*    (2006.01)
(52) U.S. Cl. ...................... 315/308; 315/291
(58) Field of Classification Search ................ 315/291, 315/307, 308, 219, 209 R, 224–226
    See application file for complete search history.

(56) References Cited

U.S. PATENT DOCUMENTS

| 5,600,211 | A | | 2/1997 | Luger .......................... 315/307 |
| 5,925,990 | A | * | 7/1999 | Crouse et al. ................ 315/307 |
| 6,337,544 | B1 | * | 1/2002 | Wang et al. .................. 315/291 |
| 6,809,938 | B2 | * | 10/2004 | Lin et al. ...................... 363/17 |
| 7,042,170 | B2 | * | 5/2006 | Vakil et al. ................... 315/291 |
| 2002/0158591 | A1 | * | 10/2002 | Ribarich et al. .............. 315/291 |

OTHER PUBLICATIONS

PIC16C712/716, 1999 Microchip Technology Inc., 5 pages.*
IEEE article published in 2002 and entitled "Design and Implementation of an Electronic Ballast for UV-Based Ozone Generation using a Low Cost Microcontroller."
IEEE article published in 2000 and entitled "An Electronic Dimming Ballast with Bifrequency and Fuzzy Logic Control."
Article published by Cypress MicroSystems, Inc. in 2003 and entitled "PSoC Dimmable Ballast Reference Design."
Article published by STMicroelectronics in 2002 and entitled "AN1501, Application Note, Simple Microcontrolled Ballast."
Article published by STMicroelectronics in 2003 and entitled "L6561, Power Factor Corrector."
Article published by STMicroelectronics in 2003 and entitled "AN966, Application Note, L6561, Enhanced Transition Mode Power Factor Corrector."
Article published by STMicroelectronics in 2000 and entitled "AN1089, Application Note, Control Loop Modeling of L6561-Based TM PFC."

(Continued)

*Primary Examiner*—Trinh V Dinh
*Assistant Examiner*—Dieu Hien T Duong
(74) *Attorney, Agent, or Firm*—Waddey & Patterson; Mark J. Patterson (57) ABSTRACT

A software controlled electronic dimming ballast for preheating, striking, and varying the dimming level of a lamp. In one embodiment, the ballast includes an EMI filter circuit, an AC/DC converter circuit, a PFC circuit, an inverter circuit, and a software controlled microcontroller circuit. The microcontroller circuit includes a microcontroller and software for generating inverter control signals that cause the inverter circuit to preheat, strike, and varying the dimming level of the lamp. The inverter control signals are generated based on dimming control and lamp dimming level feedback signals. The ballast also includes a lamp dimming level feedback signal conditioning circuit for generating the lamp dimming level feedback signals. Alternative embodiments of the ballast are also described.

15 Claims, 9 Drawing Sheets

OTHER PUBLICATIONS

Article published by International Rectifier in 2003 and entitled "Data Sheet No. PD60043-N, IR2101(S), IR2102(S), High and Low Side Driver."

Article published by LinFinity Microelectronics, Inc. in 1996 and entitled "Regulating Pulse Width Modulator."

Article published by Atmel Corporation in 2003 and entitled "8-Bit AVR with 8K Bytes In-System Programmable Flash, Atmega8, Atmega8L, Summary."

Article published by STMicroelectronics in 2001 and entitled "ST62T28C-E28C, 8-Bit MCUs with A/D Converter, Auto-Reload Timer, UART, OSG, Safe Reset and 28-pin Package."

Article published by STMicroelectronics in 2002 and entitled "AN994 Application Note, L6384, L6385, L6386, L6387, Application Guide."

* cited by examiner

SOFTWARE CONTROLLED ELECTRONIC DIMMING BALLAST

A portion of the disclosure of this patent document contains material that is subject to copyright protection. The copyright owner has no objection to the facsimile reproduction by anyone of the patent document or the patent disclosure, as it appears in the Patent and Trademark office patent file or records, but otherwise reserves all copyright rights whatsoever.

Be it known that we, Kent E. Crouse, a citizen of the United States, residing in Schaumburg, Ill., William L. Keith, a citizen of the United States, residing in Algonquin, Ill., and Gueorgui L. Grouev, a citizen of Bulgaria, residing in Arlington Heights, Ill., have invented a new and useful "Software Controlled Electronic Dimming Ballast."

BACKGROUND OF THE INVENTION

The present invention relates generally to electronic dimming ballasts for gas discharge lamps.

More particularly, this invention pertains to a software controlled electronic dimming ballast.

Electronic dimming ballasts are well known in the art. These ballasts are typically designed to be connected to and receive power from an alternating current (AC) power source and to be connected to and supply AC power to a lamp load including one or more gas discharge lamps. To facilitate this function, prior art ballasts usually include an alternating current/direct current (AC/DC) converter circuit 14 and an inverter circuit 18. The AC/DC converter circuit 14 converts low frequency AC voltage supplied by the AC power source into DC voltage and the inverter circuit 18 converts the DC voltage supplied by the AC/DC converter circuit 14 into high frequency AC voltage. In some applications, prior art ballasts may also include an electromagnetic interference (EMI) filter circuit, which is used to filter out noise in the ballast, and a power factor control circuit that is used to ensure that the power factor associated with the ballast stays at a desired level.

As the name suggests, electronic dimming ballasts are also designed so that they can be used to dim the light output of the lamp load connected to one of these ballasts. To facilitate this function, electronic dimming ballasts usually include some type of dimming control circuit that can be used to decrease and increase the light output of the lamp load. The dimming control circuit usually accomplishes this function by simply decreasing and increasing the power supplied by the inverter circuit 18 to the lamp load.

Figure 1:
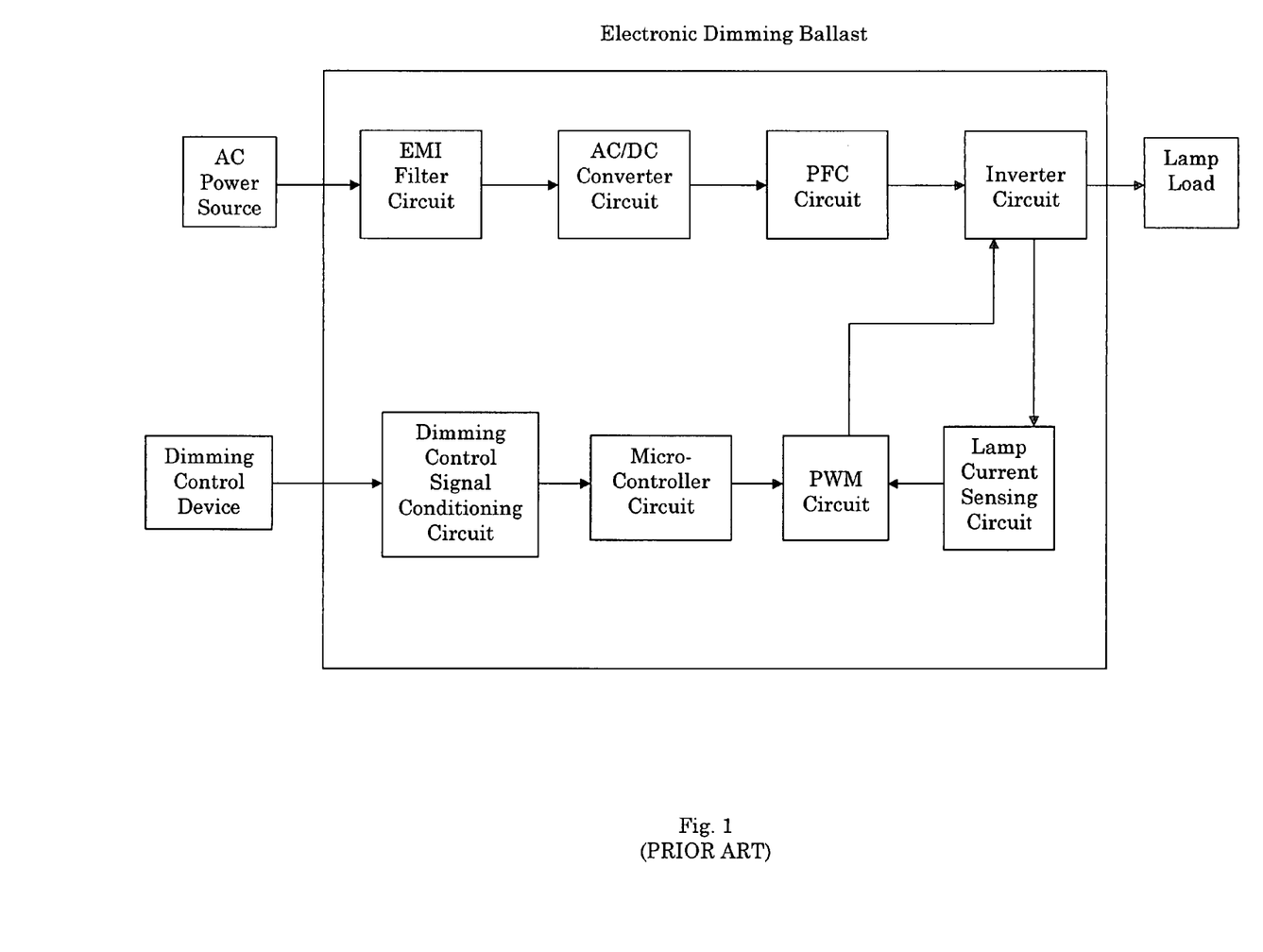
FIG. 1 is a block diagram showing a prior art electronic dimming ballast.

An example of a prior art electronic dimming ballast manufactured and sold by the assignee of the present invention, Universal Lighting Technologies, is shown in FIG. 1. This electronic dimming ballast is designed to be connected to and receive low frequency AC voltage from an AC power source and to supply high frequency AC voltage to a lamp including one or more gas discharge lamps. The ballast includes an EMI filter circuit, an AC/DC converter circuit, a PFC circuit, an inverter circuit, and a dimming control circuit.

The dimming control circuit includes a dimming control signal conditioning circuit, a microcontroller circuit, a pulse width modulator (PWM) circuit, and a lamp current sensing circuit. The dimming control signal conditioning circuit is used to receive a dimming control signal from an appropriate dimming control device and to generate a conditioned dimming control signal that can be applied to the microcontroller circuit. The microcontroller circuit is designed to generate a microcontroller dimming control signal based on the conditioned dimming control signal and to supply that signal to the PWM circuit. The lamp current sensing circuit is designed to receive a lamp current signal from the lamp load, to generate a lamp voltage signal based on that current signal, and to supply that voltage signal to the PWM circuit.

The PWM circuit uses the microcontroller dimming control signal and the lamp voltage signal to generate and supply a pulse width modulated inverter dimming control signal to the inverter circuit in the ballast. More specifically, the PWM circuit generates an error signal by comparing the microcontroller dimming control signal and the lamp voltage signal using a differential amplifier and uses that error signal to generate the appropriate pulse width modulated inverter dimming control signal. By varying the pulse width of the inverter dimming control signal, the dimming control circuit can vary the power supplied by the inverter circuit to the lamp and, as a result, can control the lamp load light output.

Although the electronic dimming ballast shown in FIG. 1 does allow one to control the dimming level of the lamp load, it has several disadvantages. First, the dimming control circuit in this ballast requires a relatively high number of electronic components, i.e., the dimming control signal conditioning circuit, the microcontroller circuit, the PWM circuit, and the lamp current sensing circuit, and takes up a large amount of space in the ballast. This increases the size of the ballast and makes it undesirable in applications where available space is limited. Second, the high number of electronic components increases the overall cost of the ballast and makes it unsuitable for certain applications.

What is needed, then, is an electronic dimming ballast that requires fewer components, is smaller, and is less expensive than the electronic dimming ballast discussed above, as well as other prior art electronic dimming ballasts suffering from similar problems.

SUMMARY OF THE INVENTION

Accordingly, one object of the present invention is to provide an electronic dimming ballast that includes fewer electronic components than prior art electronic dimming ballasts.

A second object is to provide an electronic dimming ballast that is smaller than prior art electronic dimming ballasts.

Another object of the present invention is to provide an electronic dimming ballast that is less expensive than prior art electronic dimming ballasts.

A fourth object is to provide a dimming control circuit for an electronic dimming ballast that includes fewer electronic components and takes up less space in an electronic dimming ballast than prior art dimming control circuits.

Another object of the present invention is to provide an electronic dimming ballast that does not require the use of a PWM chip and its associated circuitry.

These objects, and other objects that will become apparent to one skilled in the art, are satisfied by the software controlled electronic dimming ballast (the "software dimming ballast") of the present invention. In one embodiment, the software dimming ballast of the present invention includes an EMI filter circuit, an AC/DC converter circuit, a PFC circuit, an inverter circuit, a lamp dimming level feedback signal conditioning circuit, and a software controlled microcontroller circuit. The EMI filter circuit is designed to receive low frequency AC voltage from an AC power source and to filter noise out of that voltage to generate a filtered low frequency AC voltage. The AC/DC converter circuit is designed to convert the filtered low frequency AC voltage into a rectified AC voltage and to supply that voltage to the PFC circuit. The PFC circuit is designed to convert the rectified AC voltage into a boosted DC voltage and to ensure that power drawn from the AC power source by the software dimming ballast has a desired power factor.

The inverter circuit is designed to receive the boosted DC voltage from the PFC circuit and to generate high frequency AC voltages and currents that preheat, ignite, and cause the lamp to have a variety of different lamp dimming levels. The high frequency AC voltages and currents are generated by the inverter circuit based on inverter control signals received from the software controlled microcontroller circuit.

The lamp dimming level feedback signal conditioning circuit is designed to sense lamp currents, to generate lamp dimming level feedback signals based on the sensed lamp currents, to condition these feedback signals to generate conditioned feedback signals that can be applied to the software controlled microcontroller circuit, and to supply these conditioned feedback signals to the software controlled microcontroller circuit. The conditioned feedback signals are representative of existing lamp dimming levels and the present invention uses these signals to determine if the lamp is at desired lamp dimming levels.

The software controlled microcontroller circuit is designed to generate the inverter control signals that cause the inverter circuit to generate the high frequency AC voltages and currents that preheat, ignite, and cause the lamp to have a variety of different lamp dimming levels. To generate these control signals, the software controlled microcontroller circuit includes a micro controller integrated circuit (IC) that is used to generate the control signals and control software that causes the microcontroller IC to generate the control signals. To generate an inverter control signal that causes the inverter circuit to generate an AC voltage and current that preheats the lamp, the control software causes the microcontroller IC to generate a pulse width modulated inverter control signal having a frequency that is much higher than the natural resonance frequency of a resonant output circuit included in the inverter circuit. To generate an inverter control signal that causes the inverter circuit to generate an AC voltage and current that ignites the lamp, the control software causes the microcontroller IC to generate a pulse width modulated inverter control signal having a frequency that is approximately equal to the natural resonance frequency of the resonant circuit. To generate inverter control signal that cause the inverter circuit to generate AC voltages and currents that cause the lamp to have different lamp dimming levels, the microcontroller IC is designed to receive and convert dimming control signals representative of desired lamp dimming levels and the conditioned lamp dimming level feedback signals representative of existing lamp dimming levels into digital data. The control software then uses this digital data to determine if the lamp is at desired lamp dimming levels and to generate pulse width modulated inverter control signals having varying duty cycles in order to vary the dimming level of the lamp. Each one of these control signals has a frequency that is slightly higher than the natural resonance frequency of the resonant circuit.

The software controlled microcontroller circuit is also designed to monitor the low frequency AC voltage supplied to the software dimming ballast and to shut down the ballast if that voltage drops too low. In addition, the software controlled microcontroller circuit is further designed to monitor the operating condition of the lamp connected to the software dimming ballast and to shut down the ballast if the lamp reaches an end of lamp life fault condition.

The embodiment of the present invention discussed above may vary in a number of different ways and these variations are described in more detail in the detailed description of the preferred embodiments.

DESCRIPTION OF THE PREFERRED EMBODIMENTS

Figure 2:
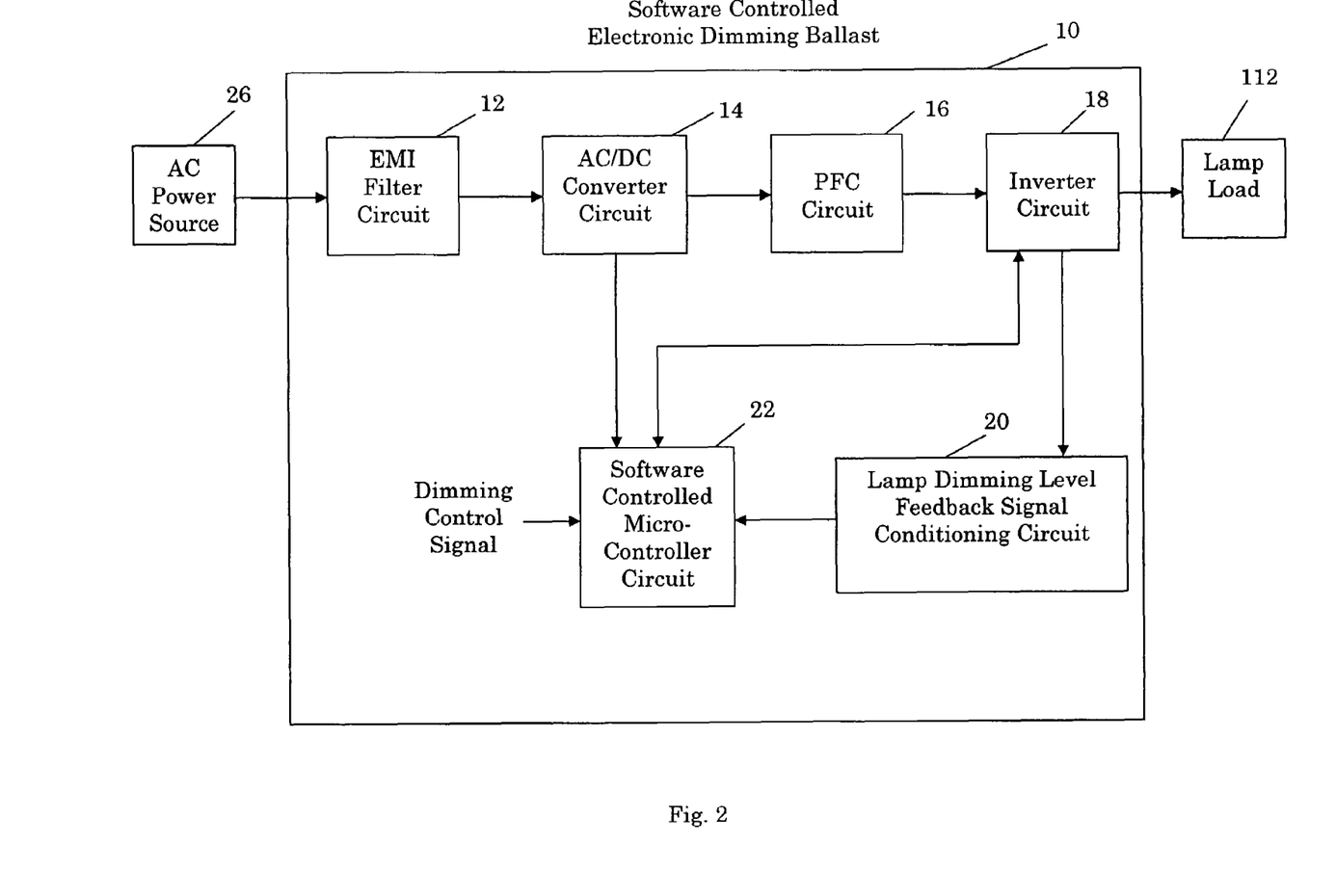
FIG. 2 is a block diagram showing a preferred embodiment of the software controlled electronic dimming ballast of the present invention.

Referring now to FIG. 2, a preferred embodiment of the software controlled electronic dimming ballast 10 (the "software dimming ballast 10") of the present invention includes an electromagnetic interference (EMI) filter circuit 12, an alternating current/direct current (AC/DC) converter circuit 14, a power factor correction (PFC) circuit 16, an inverter circuit 18, a lamp dimming level feedback signal conditioning circuit 20, and a software controlled microcontroller circuit 22.

The EMI Filter Circuit

The EMI filter circuit 12 includes an EMI input so it can be connected to a 120 volt, 60 Hertz (Hz), sinusoidal AC power source 26 (the "AC power source 26") and receive low frequency, 60 Hz, sinusoidal AC input voltage (the "AC input voltage") from that source. The EMI filter circuit 12 generates filtered low frequency sinusoidal AC voltage (the "filtered AC voltage") by filtering electromagnetic interference, i.e., noise, out of the voltage supplied by the AC power source 26 and supplies the filtered AC voltage to the AC/DC converter circuit 14. The filtered AC voltage is supplied to the AC/DC converter circuit 14 using an EMI output included with the EMI filter circuit 12. The EMI filter circuit 12 also prevents noise generated by the PFC circuit 16 and the inverter circuit 18 from passing back into the AC power source 26.

Figure 3:
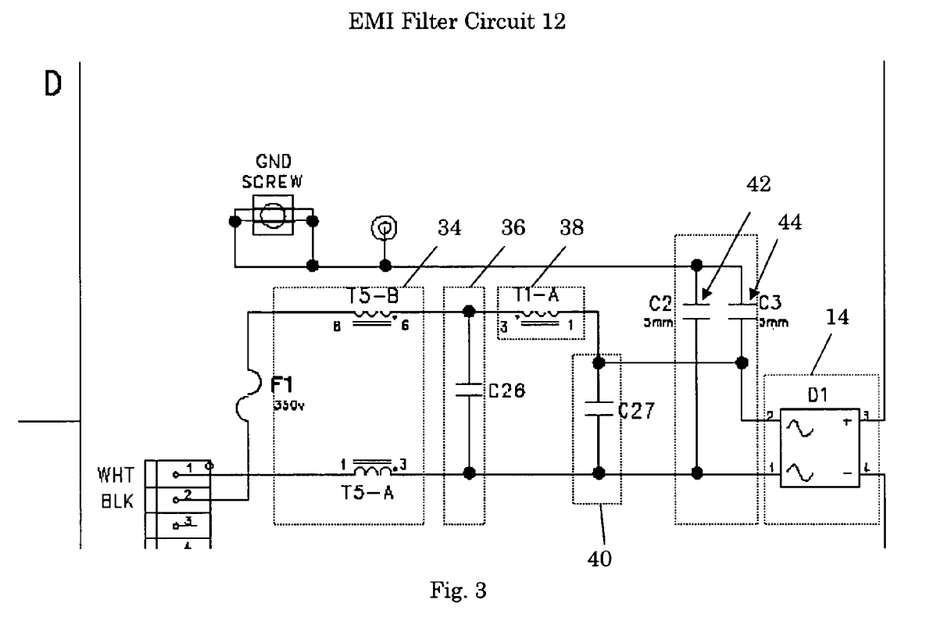
FIG. 3 is schematic showing a preferred embodiment of the EMI filter circuit and the AC/DC converter circuit of the present invention.

As shown in FIG. 3, the EMI filter circuit 12 includes a common mode choke 34, a differential mode line capacitor 36, a differential mode choke 38, a second differential mode line capacitor 40, and two line bypass capacitors, 42 and 44. The common mode choke 34 and the line bypass capacitors, 42 and 44, suppress common mode noise, and the differential mode line capacitors, 36 and 40, and choke 38 suppress differential mode noise.

The AC/DC Converter Circuit

The AC/DC converter circuit 14 (the "converter circuit 14") includes a converter input for receiving the filtered AC voltage from the EMI filter circuit 12 and a converter output for supplying a full wave rectified AC voltage (the "rectified AC voltage") to the PFC circuit 16. The converter circuit 14 rectifies the filtered AC voltage supplied by the EMI filter circuit 12 using a full bridge rectifier (not shown).

The PFC Circuit

The PFC circuit 16 causes power drawn from the AC power source 26 by the software dimming ballast 10 to have a power factor ranging from approximately 0.95 to 1 and supplies an approximately constant boosted DC voltage (the "boosted DC voltage") to the inverter circuit 18. The boosted DC voltage is approximately 450 volts DC. The PFC circuit 16 (see FIG. 4) includes a PFC input, a PFC input filter 56, a PFC transistor circuit 58, a PFC control circuit 60, two PFC inductors, 62 and 64, a PFC diode 66, two bulk capacitors, 68 and 70, and a PFC output.

Figure 4:
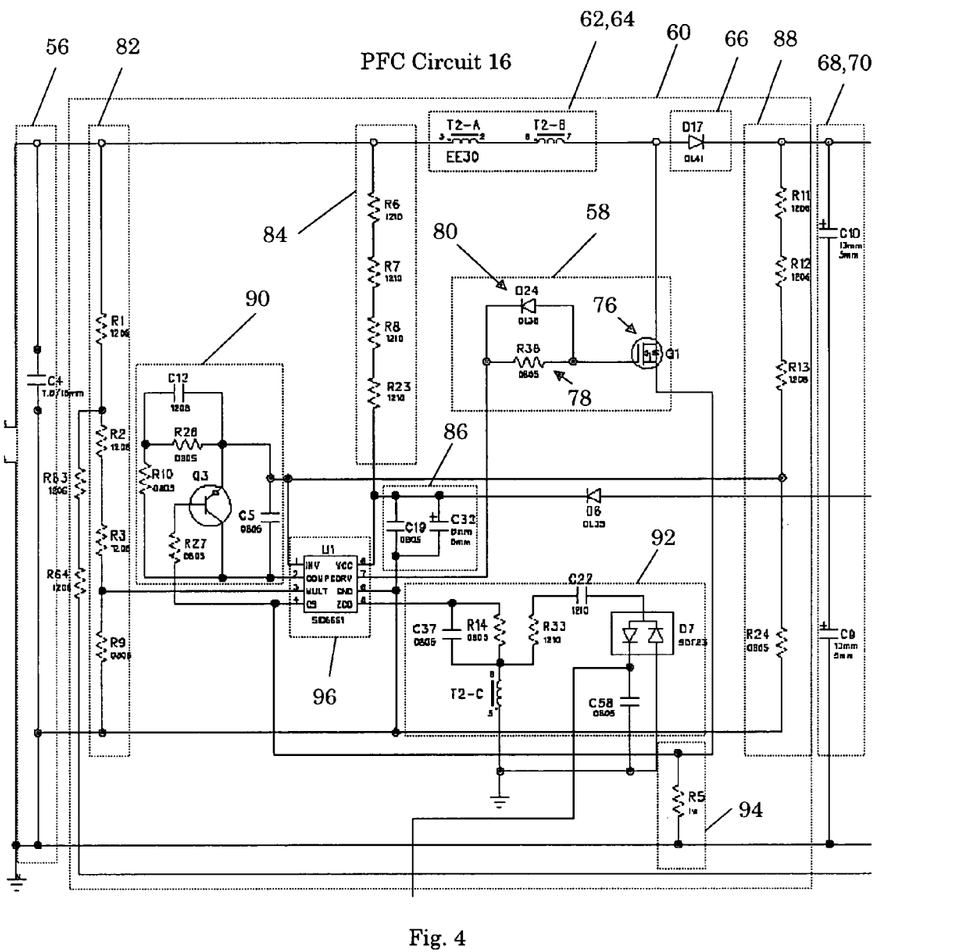
FIG. 4 is a schematic showing a preferred embodiment of the PFC circuit of the present invention.

The PFC input receives the rectified AC voltage from the converter circuit 14 and the PFC output supplies the boosted DC voltage to the inverter circuit 18. The PFC input filter 56 filters high frequency noise caused by high frequency switching of the PFC transistor circuit 58 and prevents that noise from passing back into the converter circuit 14 and the AC power source 26. The PFC control circuit 60 controls the PFC circuit 16 so that it draws a DC current from the converter circuit 14 that has a waveform that is approximately the same as the waveform of the rectified AC voltage supplied by the converter circuit 14. The PFC control circuit 60 accomplishes this function by periodically switching a PFC transistor 76 in the PFC transistor circuit 58 off and on, i.e., by periodically making the PFC transistor 76 nonconductive (off) and conductive (on), and by varying the frequency at which the PFC transistor 76 is switched off and on. The transistor switching frequency ranges from approximately 10-15 kHz. When the PFC transistor 76 is on, current flows from the converter circuit 14, through the PFC inductors, 62 and 64, and through the PFC transistor 76 to ground. When the PFC transistor 76 is off, energy stored in the PFC inductors, 62 and 64, causes current to flow out of the PFC inductors, 62 and 64, through the PFC diode 66 to the bulk capacitors, 68 and 70. The resulting DC current charges the bulk capacitors, 68 and 70, and generates the boosted DC voltage 52 that is supplied to the inverter circuit 18. The PFC diode 66 prevents current from flowing back from the bulk capacitors, 68 and 70, into the PFC circuit 16.

As shown in FIG. 4, the PFC input filter 56 is simply a capacitor 56 (the "PFC capacitor 56"). The PFC capacitor 56 is sized so that it passes the rectified AC voltage generated by the converter circuit 14 and blocks higher frequency noise generated by the switching of the PFC transistor circuit 58. The PFC transistor circuit 58 includes the PFC transistor 76, a PFC gate resistor 78 for limiting gate current flow into the gate of the PFC transistor 76, and a PFC gate diode 80 for allowing gate current to flow out of the PFC transistor 76 and bypass the PFC gate resistor 78.

The PFC control circuit 60 shown in FIG. 4 includes a multiplier input resistive voltage divider 82 (the "multiplier input divider 82"), a supply voltage resistive voltage divider 84 (the "supply voltage divider 84") connected to a supply voltage input filter 86, an output voltage resistive voltage divider 88 (the "output voltage divider 88"), a voltage feedback compensation network 90 (the "feedback network 90"), a zero current detector circuit 92, a current sense resistor 94, and a PFC integrated circuit (IC) 96 (the "PFC IC 96"). The multiplier input divider 82 generates a rectified multiplier input voltage that is proportional to the rectified AC voltage supplied by the converter circuit 14 and supplies that voltage to a multiplier input pin on the PFC IC 96. The supply voltage divider 84 generates a rectified supply voltage that is proportional to the rectified AC voltage supplied by the converter circuit 14 and the supply voltage input filter 86 filters the rectified supply voltage to generate a filtered supply voltage that is an approximately constant DC supply voltage. This voltage is supplied to a PFC supply voltage input pin on the PFC IC 96.

The output voltage divider 88 generates a feedback voltage that is proportional to the boosted DC voltage generated by the PFC circuit 16 and supplies that voltage to an inverting input pin on the PFC IC 96. The feedback network 90 is connected to the inverting input pin and a comparator input pin on the PFC IC 96 and ensures that the PFC control circuit 60 operates in a stable manner. The zero current detector circuit 92 detects when the DC current flowing through the PFC inductor reaches zero, generates a zero current voltage indicative of that fact, and supplies this voltage to a zero current detector input on the PFC IC 96. The current sense resistor 94 generates a current sense voltage that is representative of current flowing through the PFC transistor 76 and supplies this voltage to a current sense input pin on the PFC IC 96. In addition to the pins referenced above, the PFC IC 96 also includes a ground input pin that is connected to ground and a gate driver output pin that is connected to the gate resistor 78 included with the PFC transistor circuit 58.

The PFC IC 96 uses the voltage signals applied to its input pins to generate a gate driver voltage that is supplied to the PFC transistor 76 using the gate driver output pin on the PFC IC 96. The gate driver voltage causes the PFC transistor 76 to switch off and on as indicated previously. The PFC IC 96 is a conventional PFC IC, part number L6561, manufactured and sold by STMicroelectronics. Detailed information regarding the internal structure and operation of this IC, as well as some of its associated circuitry discussed above, is described in Application Notes AN966 and AN1089 and a document entitled "Power Factor Corrector" published by STMicroelectronics. Those documents are hereby incorporated by reference into this application.

The Voltage Regulator Circuit

Figure 5:
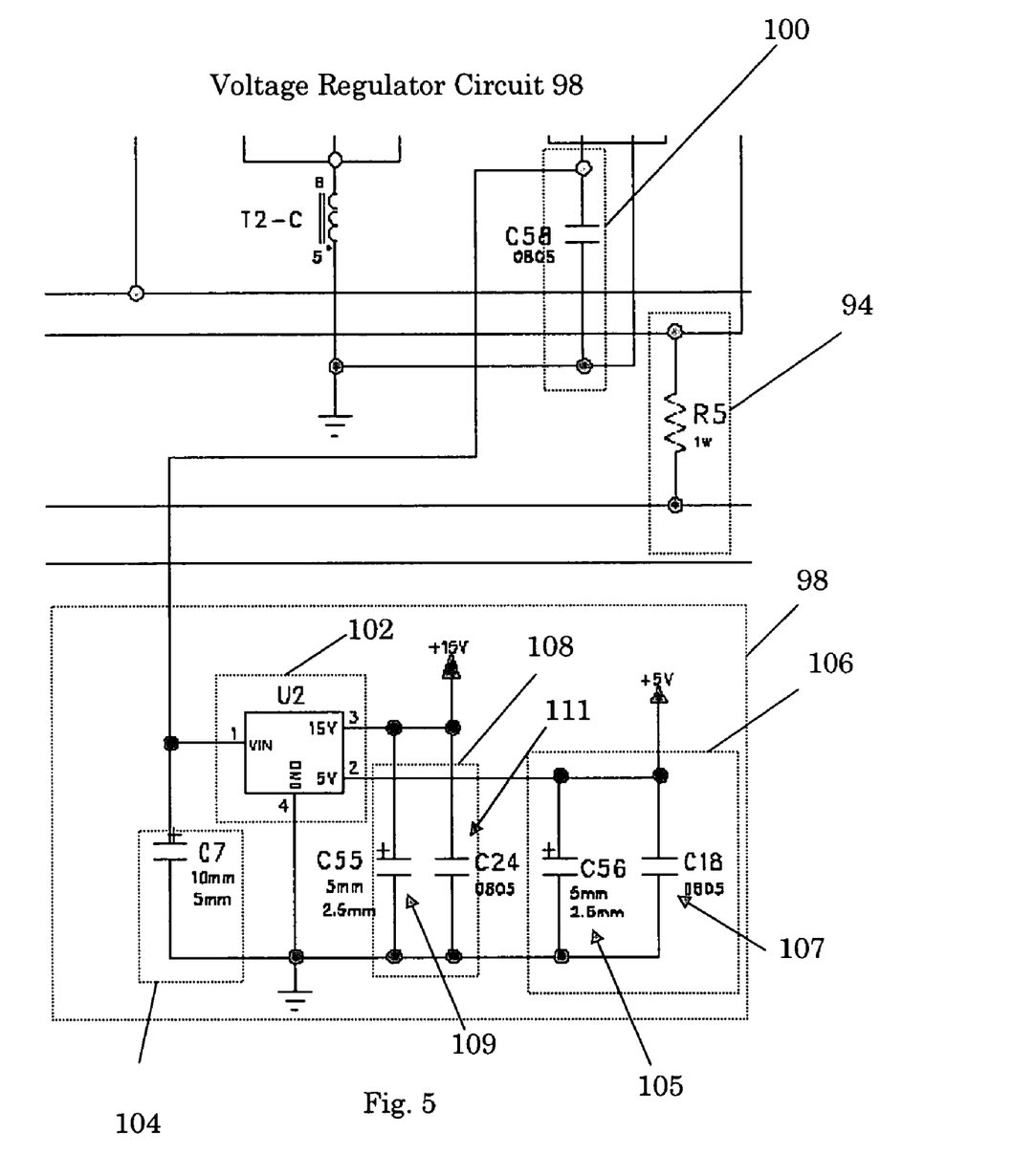
FIG. 5 is a schematic showing a preferred embodiment of the voltage regulator circuit of the present invention.

As shown in FIG. 5, the PFC circuit 16 also includes a voltage regulator circuit 98 (the "regulator circuit 98") that generates +5 and +15 voltage reference voltages that can be used by the various ICs included in the software dimming ballast 10. The regulator circuit 98 is connected to the zero current detector circuit 92 as shown in FIG. 5 and generates the +5 and +15 volt reference voltages based on a voltage generated across a capacitor 100 in that circuit. The regulator circuit 98 includes a regulator IC 102, a regulator input filter 104, a +5 volt output filter 106, and a +15 volt output filter 108.

The regulator IC 102 generates the +5 and +15 volt reference voltages output by the regulator circuit 98. The regulator IC 102 used in this embodiment is part number TLE 4484, manufactured and sold by Infineon. Detailed information regarding the internal structure and operation of this IC is described in a document entitled Dual Voltage Regulator with 5 and 15 Volt Outputs, TLE 4484, published by Infineon. That document is hereby incorporated by reference into this application.

The regulator input filter 104 smoothes the voltage that is generated by the zero current detector capacitor 100 and supplied to the regulator circuit 98 so that it is approximately constant, the +5 volt output filter 106 smoothes the +5 volt signal output by the regulator circuit 98 so that it is approximately constant, and the +15 volt output filter 108 smoothes the +15 volt signal output by the regulator circuit 98 so that it is approximately constant. As shown in FIG. 5, the regulator input filter 104 is simply a capacitor 103, the +5 volt output filter 106 is simply a pair of capacitors, 105 and 107, connected in parallel, and the +15 volt output filter 108 is simply a pair of capacitors, 109 and 111, connected in parallel.

The Inverter Circuit

Figure 6:
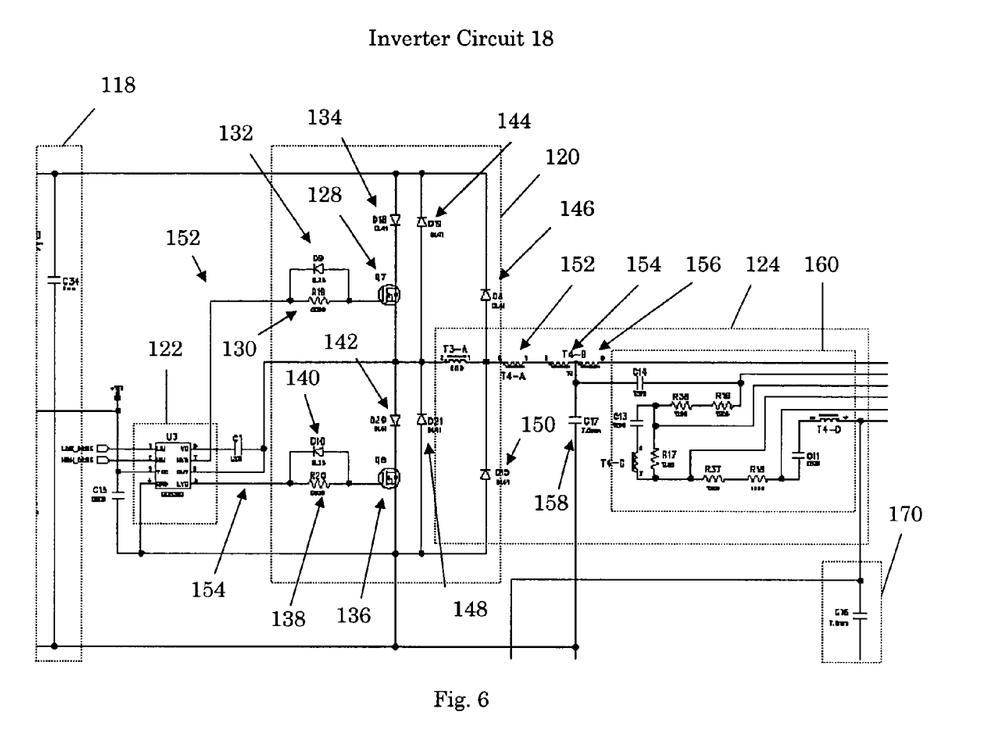
FIG. 6 is a schematic showing a preferred embodiment of the inverter circuit of the present invention.

Referring to FIGS. 2 and 6, the inverter circuit 18 converts the boosted DC voltage supplied by the PFC circuit 16 into high frequency sinusoidal AC output voltages (the "AC output voltages") and uses these voltages to supply high frequency sinusoidal AC output currents (the "AC output currents") to a fluorescent lamp 112 (the "lamp 112"). These voltages and currents are used to preheat, ignite, and vary the dimming level of the lamp 112.

To preheat that lamp 112, the inverter circuit 18 generates an AC output voltage and current having a frequency that is much higher than the natural resonance frequency of a resonant output circuit included in the inverter circuit 18. The resonant output circuit is described in more detail below. The magnitude of the AC output voltage generated by the inverter circuit 18 is relatively small compared to the magnitude of the boosted DC voltage supplied by the PFC circuit 16 and is insufficient to ignite the lamp 112.

To ignite the lamp 112, the inverter circuit 118 generates an AC output voltage and current having a frequency that is approximately equal to the natural resonance frequency of the resonant output circuit. This voltage has a magnitude that is approximately equal to the magnitude of the boosted DC voltage supplied by the PFC circuit 16 and is sufficient to ignite the lamp 112.

To vary the dimming level of the lamp 112, the inverter circuit 18 generates AC output voltages and currents having the same frequency but that have varying magnitudes that depend on the desired dimming level of the lamp 112. Each one of these AC output voltages and currents has a frequency that is slightly higher than the natural resonance frequency of the resonant output circuit.

To increase the dimming level of the lamp, the inverter circuit 18 decreases the magnitude of the AC output current. This causes the magnitude of the AC output current supplied to the lamp 112 to decrease and causes the lamp 112 to dim. In a similar manner, the inverter circuit 18 increases the magnitude of the AC output current in order to decrease the lamp dimming level. This causes the magnitude of the AC output current supplied to the lamp 112 to increase and causes the lamp 112 to brighten.

The inverter circuit 18 generates the AC output voltages and currents based on inverter control signals received from the software controlled microcontroller circuit 22. The inverter control signals and the software controlled microcontroller 22 are described in more detail below.

The inverter circuit 18 includes an inverter input that receives the boosted DC voltage supplied by the PFC circuit 16 and an inverter output that can be used to supply the AC output voltage to the lamp 112. The inverter circuit 18 also includes an inverter input filter 118, a half bridge transistor switching circuit 120 (the "transistor switching circuit 120"), a half bridge transistor switching control circuit 122 (the "switching control circuit 122"), and a series resonant inductor/capacitor (LC) output circuit (the "resonant output circuit 124").

The inverter input filter 118 filters high frequency noise generated by the switching of the transistor switching circuit 120 and prevents it from passing back to the PFC circuit 16 and the AC power source 26. As shown in FIG. 6, the inverter input filter 118 is simply a capacitor 118 (the "inverter capacitor 118") sized to pass DC voltage and to short circuit high frequency currents.

The transistor switching circuit 120 converts the boosted DC voltage supplied by the PFC circuit 16 into high frequency pulsed AC voltages having magnitudes that vary from approximately zero to 450 volts, frequencies that range from being much higher, approximately equal to, and slightly higher than the natural resonance frequency of the resonant output circuit, and duty cycles that vary depending upon the desired lamp dimming level. The pulsed AC voltage having a frequency much higher than the natural resonant frequency of the resonant output circuit causes the inverter circuit 18 to generate the AC voltage and current necessary to preheat the lamp 112. The pulsed AC voltage having a frequency that is approximately equal to the natural resonant frequency causes the inverter circuit 18 to generate the AC voltage and current necessary to ignite the lamp 112. The pulsed AC voltages having frequencies that are slightly higher than the natural resonant frequency of the resonant output circuit and varying duty cycles cause the inverter circuit 18 to generate the AC voltages and currents that vary the dimming level of the lamp 112.

The duty cycle of the pulsed AC voltages is defined as the ratio of the time that the pulsed AC voltage is 450 volts over the time that the pulsed AC voltage is zero volts during a given period of the pulsed AC voltage. In other words, the duty cycle represents the percentage of time that the pulsed AC voltage is nonzero for a given period of the pulsed AC voltage.

The transistor switching circuit 120 generates pulsed AC voltages having duty cycles ranging from approximately 20% for a maximum desired lamp dimming level to approximately 96% for a minimum desired lamp dimming level.

As shown in FIG. 6, the transistor switching circuit 120 includes a high side power transistor 128 (the "HS transistor 128"), a high side transistor gate resistor 130 (the "HS gate resistor 130"), a high side transistor gate diode 132 (the "HS gate diode 132"), and a high side transistor blocking diode 134 (the "HS blocking diode 134"). The transistor switching circuit 120 also includes a low side power transistor 136 (the "LS transistor 136"), a low side transistor gate resistor 138 (the "LS gate resistor 138"), a low side transistor gate diode 140 (the "LS gate diode 140"), and a low side transistor blocking diode 142 (the "LS blocking diode 142"). The transistor switching circuit 120 further includes four free wheeling diodes, 144, 146, 148, and 150, connected as indicated in FIG. 6.

The HS gate resistor 130 limits gate current flowing into the gate of the HS transistor 128, the HS gate diode 132 allows gate current to flow out of the HS transistor 128 and bypass the HS gate resistor 130, and the HS blocking diode 134 prevents current from flowing from the resonant output circuit 124, through the HS transistor 128, and to the PFC circuit 16.

The LS gate resistor 138, gate diode 140, and blocking diode 142 operate in a similar manner with respect to the LS transistor 136. The LS gate resistor 138 limits gate current flowing into the gate of the LS transistor 136, the LS gate diode 140 allows gate current to flow out of the LS transistor 136 and bypass the LS gate resistor 138, and the LS blocking diode 142 prevents current from flowing from the PFC circuit 16, through the LS transistor 136, and into the resonant output circuit 124.

The pulsed AC voltages are generated by simply switching the HS and LS transistors off and on in a manner that converts direct current supplied by the PFC circuit 16 into alternating current. More specifically, the pulsed AC voltages are generated by alternating the switching of the HS and LS transistors. When the HS transistor 128 is on and the LS transistor 136 is off, direct current flows from the PFC circuit 16, through the HS transistor 128, and into the resonant output circuit 124. When the LS transistor 136 is on and the HS transistor 128 is off, direct current cannot flow from the PFC circuit 16 into the transistor switching circuit 120. Instead, direct current flows in from the resonant output circuit 124 and through the LS transistor 136 to ground.

The four free wheeling diodes, 144, 146, 148, and 150, are used to conduct current when both transistors are turned off. The upper diodes, 144 and 146, allow current to flow from the resonance output circuit 124 back to the PFC circuit 16 when the HS transistor 128 has been switched off. Similarly, the lower diodes, 148 and 150, allow current to flow from the PFC circuit 16 into the resonant output circuit 124 when the LS transistor 136 has been switched off.

The switching control circuit 122 controls the transistor switching circuit 120 so that the duty cycle of the pulsed AC voltages ranges from approximately 20% to 96%. To perform this function, the switching control circuit 122 generates and outputs an internal HS control signal 152 (see FIG. 6) that causes the HS transistor 128 to switch off and on, and generates and outputs an internal LS control signal 154 (see FIG. 6) that causes the LS transistor 136 to switch off and on.

The internal HS and LS control signals are generated by the switching control circuit 122 based on inverter HS and LS control signals, 156 and 158, respectively, received from the software controlled microcontroller circuit 22 (see FIGS. 2 and 8) included with this embodiment of the present invention. The software controlled microcontroller circuit 22 is discussed in more detail below. The internal HS and LS control signals are pulse width modulated control signals. In a similar manner, the inverter HS and LS control signals are pulse width modulated control signals. The primary difference between the internal and inverter control signals is that the internal control signals are suitable for driving the HS and LS transistors in the transistor switching circuit 120 and the inverter control signals are not.

By varying the pulse widths of the inverter HS and LS control signals, the duty cycle of the pulsed AC voltages can be varied. If the pulse width is increased, the duty cycle increases. If the pulse width is decreased, the duty cycle decreases.

As shown in FIG. 6, the switching control circuit 122 includes an inverter IC 122 (the "inverter IC 122") having a high side transistor drive input pin (the "HS drive input"), a low side transistor drive input pin (the "LS drive input"), an inverter supply voltage input pin (the "inverter supply input"), an inverter ground pin, a low side transistor drive output pin (the "LS drive output"), an inverter floating reference voltage output pin (the "inverter reference output"), a high side transistor drive output pin (the "HS drive output"), and a bootstrap supply voltage input pin (the "bootstrap supply input"). It is this circuit component that receives the inverter HS and LS control signals and outputs the internal HS and LS control signals. The inverter IC 122 is a conventional inverter IC, part number L6387, manufactured and sold by STMicroelectronics. Detailed information regarding the structure and operation of this IC is described in Application Note AN994 published by STMicroelectronics. That document is hereby incorporated by reference into this application.

The resonant output circuit 124 filters the pulsed AC voltages generated by the transistor switching circuit 120 to generate the AC output voltages that are supplied to the lamp 112. For the pulsed AC voltage having a frequency that is much higher than the natural resonance frequency of the resonant output circuit 124, the output circuit 124 converts the pulsed AC voltage into a sinusoidal AC voltage having a magnitude that is relatively small compared to the magnitude of the pulsed AC voltage. For the pulsed AC voltage having a frequency that is approximately equal to the natural resonance frequency, the output circuit 124 converts the pulsed AC voltage into a sinusoidal AC voltage having a magnitude that is approximately equal to the magnitude of the pulsed AC voltage.

For the pulsed AC voltages having frequencies that are slightly higher than the natural resonance frequency and varying duty cycles, the output circuit 124 converts these voltages into sinusoidal AC voltages having magnitudes that vary depending upon the duty cycles of these pulsed AC voltages. For a pulsed AC voltage having a 96% duty cycle, the magnitude of the ac output current corresponds to full brightness. For a pulsed AC voltage having approximately 20% duty cycle, the magnitude of the AC output current corresponds to full dim.

As indicated in FIG. 6, the resonant output circuit 124 includes three inductors connected in series, 160, 162, and 164, with a single capacitor 166. In addition, the resonant output circuit 124 includes a lamp filament warming and current limiting circuit 168 made up of a series of resistors, capacitors, and inductors. The three inductors, 160, 162, and 164, and the capacitor 166 perform the filtering of the square wave AC voltage 126 and cause the AC output voltage 110 to appear across the capacitor 166. The capacitor and inductors in the lamp filament warming and current limiting circuit 168 limit current flowing in the lamp 112 and the inductors are used to warm lamp filaments prior to lamp ignition.

The inverter circuit 18 also includes a half bridge DC blocking capacitor 170 that is used to sense end of lamp life fault conditions as described in more detail below, i.e. positive DC rectification, negative DC rectification, or symmetric high voltage conditions.

The Software Controlled Microcontroller Circuit 22

Figure 7:
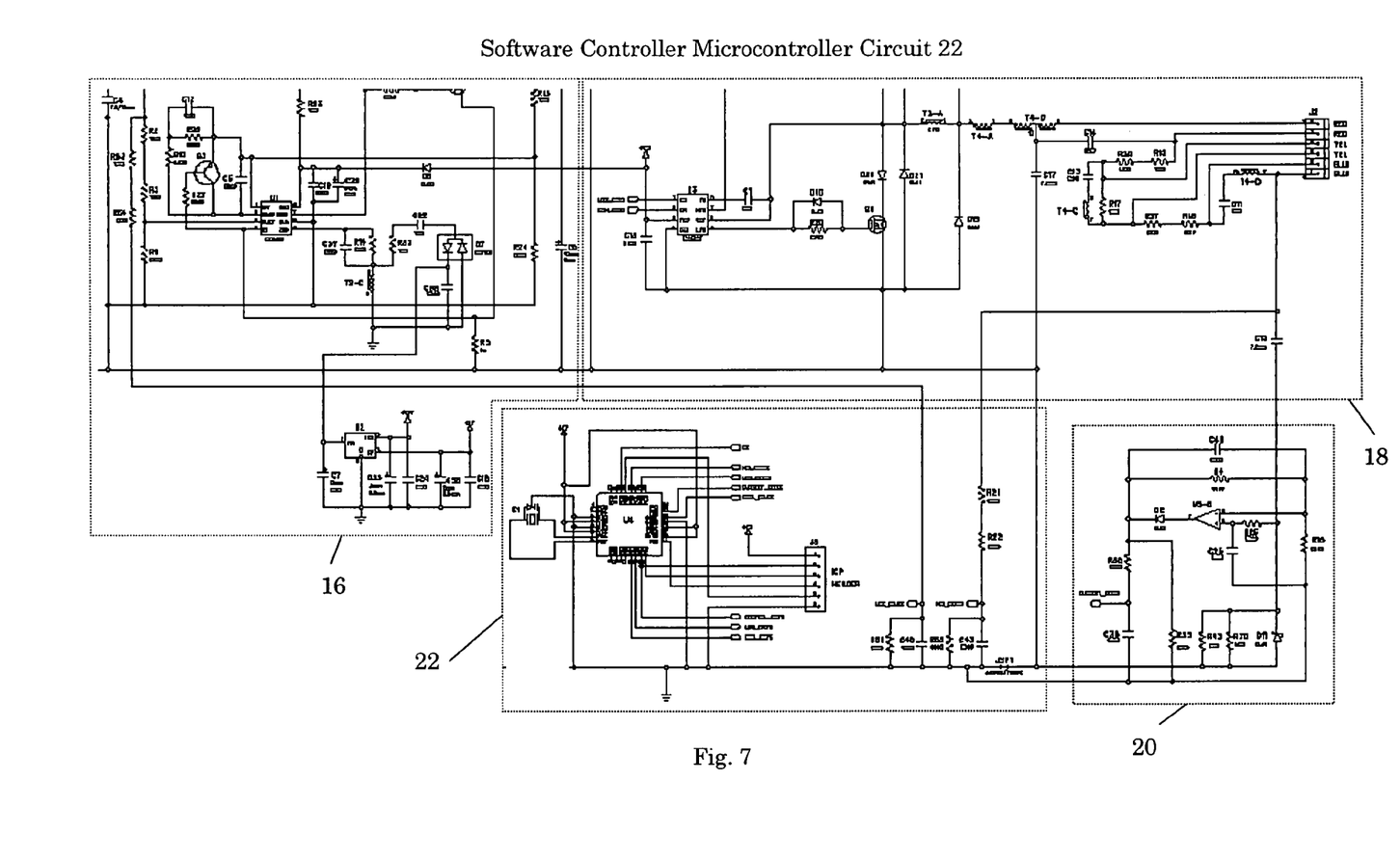
FIG. 7 is a schematic showing preferred embodiments of the microcontroller circuit and the lamp dimming level feedback signal conditioning circuit, and portions of the preferred embodiments of the PFC and inverter circuits of the present invention.

The software controlled microcontroller circuit 22 (the "microcontroller circuit 22") is connected to the PFC circuit 16, inverter circuit 18, and the lamp dimming level feedback signal conditioning circuit 20 as shown in FIG. 7 and is designed to perform a variety of different functions.

The microcontroller circuit 22 is designed to generate inverter control signals that cause the inverter circuit 18 to supply the lamp 112 with appropriate voltages and currents for preheating, striking, and varying the dimming level of the lamp 112. The microcontroller circuit 22 is designed to monitor the AC input voltage supplied to the software dimming ballast 10 and to shut down the ballast if that voltage falls below a level that can be used by the inverter circuit 18 to supply the required voltages and currents to the lamp 112. The microcontroller circuit 22 is also designed to monitor the operating condition of the lamp 112 and, when the lamp 112 reaches an end of lamp life condition, to shut down the software dimming ballast 10. The microcontroller circuit 22 is further designed to control the dimming level of the lamp 112 based on analog or digital dimming control signals representative of a desired lamp dimming level and a lamp dimming level feedback signal representative of an existing lamp dimming level.

The microcontroller circuit 22 implements its various functions using a microcontroller IC and control software loaded on that IC, both of which are discussed in more detail below.

The Microcontroller IC

Figure 8:
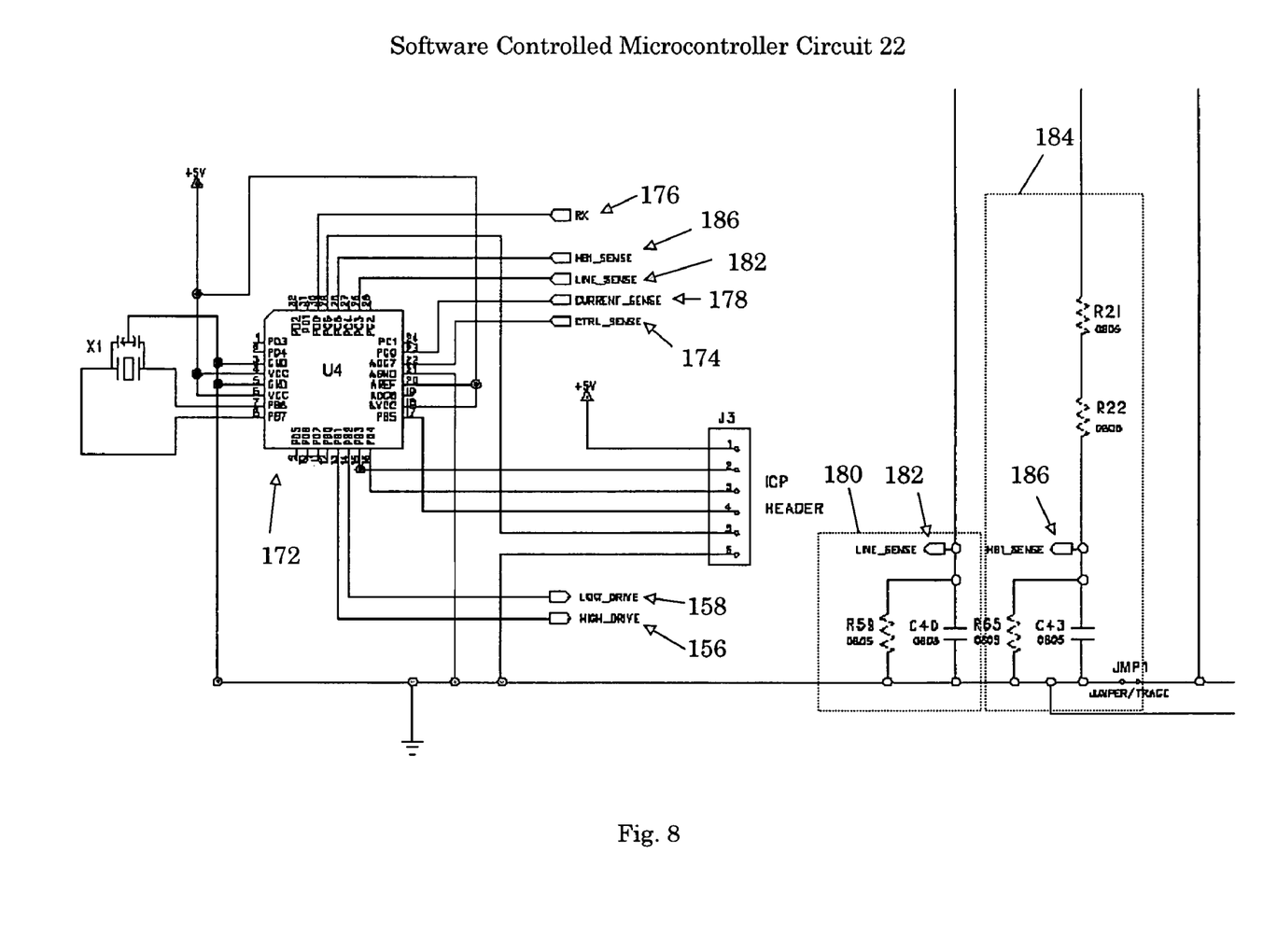
FIG. 8 is a schematic showing an enlarged view of the preferred embodiment of the microcontroller circuit and preferred embodiments of the line voltage signal conditioning circuit and the blocking capacitor signal conditioning circuit of the present invention.

Referring now to FIG. 8, the microcontroller circuit 22 includes a microcontroller IC 172 that is used to generate the inverter HS and LS control signals, 156 and 158, that are supplied to the switching control circuit 122 in the inverter circuit 18, and control software (not shown) that is used to cause the microcontroller IC 172 to generate those control signals.

The microcontroller IC 172 includes an analog dimming control signal input (the "analog dimming input"), a digital dimming control signal input (the "digital dimming input"), a lamp dimming level feedback signal input (the "lamp feedback input"), a line voltage feedback signal input (the "line feedback input"), a DC blocking capacitor feedback signal input (the "blocking capacitor feedback input"), a microcontroller HS transistor control signal output (the "microcontroller HS control output"), and a microcontroller LS transistor control signal output (the "microcontroller LS control output").

The microcontroller IC 172 shown in FIG. 8 is part number ATmega8, manufactured and sold by Atmel Corporation. The operation and capabilities of this IC are described in a document entitled "8-bit AVR with 8 K Bytes In-System Programmable Flash" published by Atmel. That document is hereby incorporated by reference into this application.

The analog dimming input is designed to receive an analog DC voltage dimming control signal representative of a desired lamp dimming level 174 (the "analog dimming control signal 174"). The analog dimming control signal 174 may have a value ranging from 0-5 volts DC, with 0 volts representing a maximum lamp dimming level and 5 volts representing a minimum dimming level. This signal is used by the microcontroller circuit 22 to determine the desired dimming level for the lamp 112.

In a similar manner, the digital dimming input is designed to receive a digital dimming control signal 176 representative of a desired lamp dimming level. The digital dimming control signal 176 includes digital codes representing lamp dimming levels ranging from a minimum lamp dimming level to a maximum lamp dimming level. As was the case with the analog dimming control signal 174, the microcontroller circuit 22 uses the digital dimming control signal 176 to determine the desired dimming level for the lamp 112.

The lamp feedback input is connected to a lamp dimming level feedback signal conditioning circuit 20 (see FIGS. 2 and 9), which is described in more detail below, and is designed to receive an analog DC voltage feedback signal 178 representative of an existing lamp dimming level generated by that circuit (the "lamp dimming level feedback signal 178"). The lamp dimming level feedback signal 178 may have a value ranging from 0-5 volts DC, with 0 volts representing a maximum existing dimming level and 5 volts representing a minimum existing dimming level. The microcontroller circuit 22 uses this feedback signal to determine the existing lamp dimming level.

The line feedback input is connected to the PFC circuit 16 through a line voltage signal conditioning circuit 180 (see FIG. 8) and is designed to receive a rectified AC voltage 182 that is proportional to the rectified AC voltage generated by the AC/DC converter circuit 14 and conditioned by the line voltage signal conditioning circuit 180 (the "line feedback signal 182"). The line feedback signal 182 may have a value ranging from 0-5 volts DC, with 0 volts representing a minimum line voltage and 5 volts representing a maximum line voltage. The microcontroller circuit 22 uses this feedback signal to monitor the AC input voltage 28 supplied by the AC power source 26 and, if it drops too low, shuts down the software dimming ballast 10.

The blocking capacitor feedback input is connected to the half bridge DC blocking capacitor 170 (the "blocking capacitor 170") through a blocking capacitor signal conditioning circuit 184 (see FIG. 8) and is designed to receive a DC voltage 186 that develops on the blocking capacitor 170 (the "blocking capacitor feedback signal 186") and is conditioned by the blocking capacitor signal conditioning circuit 184. The blocking capacitor feedback signal 186 may have a value ranging from 0-5 volts DC. The microcontroller circuit 22 uses this feedback signal to monitor the condition of the lamp 112 and to detect end of lamp life fault conditions. If an end of lamp life condition occurs, the microcontroller circuit 22 shuts down the software dimming ballast 10.

The microcontroller IC 172 converts the analog dimming control signal 174, the lamp dimming level feedback signal 178, the line feedback signal 182, and the blocking capacitor feedback signal 186 into digital data. The analog dimming control signal 174 is converted into digital data that is representative of the desired lamp dimming level associated with the analog dimming control signal (the "desired dimming level digital data") and the lamp dimming level feedback signal 178 is converted into digital data representative of the existing lamp dimming level associated with the lamp dimming level feedback signal (the "existing dimming level digital data"). In a similar manner, the line feedback signal 182 is converted into digital data representative of the line voltage associated with the line feedback signal (the "line voltage digital data") and the blocking capacitor feedback signal 186 is converted into digital data representative of the blocking capacitor voltage associated with the blocking capacitor feedback signal (the "blocking capacitor digital data").

The inverter HS control output is connected to the HS drive input on the switching control circuit 122 in the inverter circuit 18 and is used to supply the switching control circuit 122 with the microcontroller HS control signal discussed previously.

The microcontroller LS drive output is connected to the LS drive input on the switching control circuit 122 in the inverter circuit 18 and is used to supply the switching control circuit 122 with the inverter LS control signal discussed previously.

The Control Software

The applicant of the present application has developed three different versions of the control software (the "software") that can be loaded on the microcontroller IC 172 and used to control lamp preheating, striking, and dimming. The first, the analog control software, is designed to be used when lamp dimming is controlled using the analog dimming control signal. The second, the digital control software, is designed to be used when lamp dimming is controlled using the digital dimming control signal. And, the third, the combination control software, is designed to be used when lamp dimming is controlled using either an analog dimming control signal or a digital dimming control signal. The preheating and striking code used in each version of the software is the same.

The analog control software (the "analog software") is designed to cause the microcontroller IC 172 to compare the desired dimming level digital data 188 and the existing dimming level digital data 190 to determine if the lamp 112 is at the desired lamp dimming level. If not, the analog software causes the microcontroller IC 172 to change the duty cycle, i.e., the pulse width, of the inverter HS and LS pulse width modulated control signals until the lamp 112 reaches the desired lamp dimming level.

If the existing lamp dimming level is higher than the desired lamp dimming level, i.e., the existing lamp light output is dimmer than desired, the pulse width is increased and the lamp light output increases. Conversely, if the existing lamp dimming level is lower than desired, i.e., the existing lamp light output is brighter than desired, the pulse width is decreased and the lamp light output decreases.

The analog software is also designed to read the line voltage digital data and the blocking capacitor digital data and to store this data in the microcontroller IC 712. The analog software compares the line voltage digital data to digital data stored in the microcontroller memory that is representative of a minimum line voltage that can be applied to the software dimming ballast 10 and that allows the inverter circuit 18 to operate properly (the "minimum line voltage data"). If the comparison indicates that the line voltage is below the minimum line voltage, the analog software causes the microcontroller IC 172 to shut down the software dimming ballast 10.

The analog software compares the blocking capacitor digital data to digital data stored in the microcontroller IC 172 that is representative of a DC end of lamp life voltage on the blocking capacitor 170 that indicates the lamp 112 has reached an end of lamp life condition (the "end of lamp life data"). If the comparison indicates that the voltage on the blocking capacitor 170 is equal to the end of lamp life voltage, the analog software causes the microcontroller IC 172 to shut down the software dimming ballast 10.

The digital software operates in a similar manner. The digital software is designed to read the digital data applied to the digital dimming input and the existing dimming level digital data generated by the microcontroller IC 172 and to store that data in the microcontroller IC 172. The digital software then processes the desired dimming level digital data and the existing dimming level digital data in the same manner as the analog software discussed above.

The combination software includes code that allows it to determine if an analog dimming control signal or a digital dimming control signal has been applied to the microcontroller IC 172. If an analog dimming control signal is applied, the combination software operates in the same manner as the analog software described previously. If a digital dimming control signal is applied, the combination software operates in the same manner as the digital software discussed above. If both types of dimming control signals are applied, the combination software defaults to using the digital dimming control signal to control lamp dimming.

The Lamp Dimming Level Feedback Signal Conditioning Circuit 20

Figure 9:
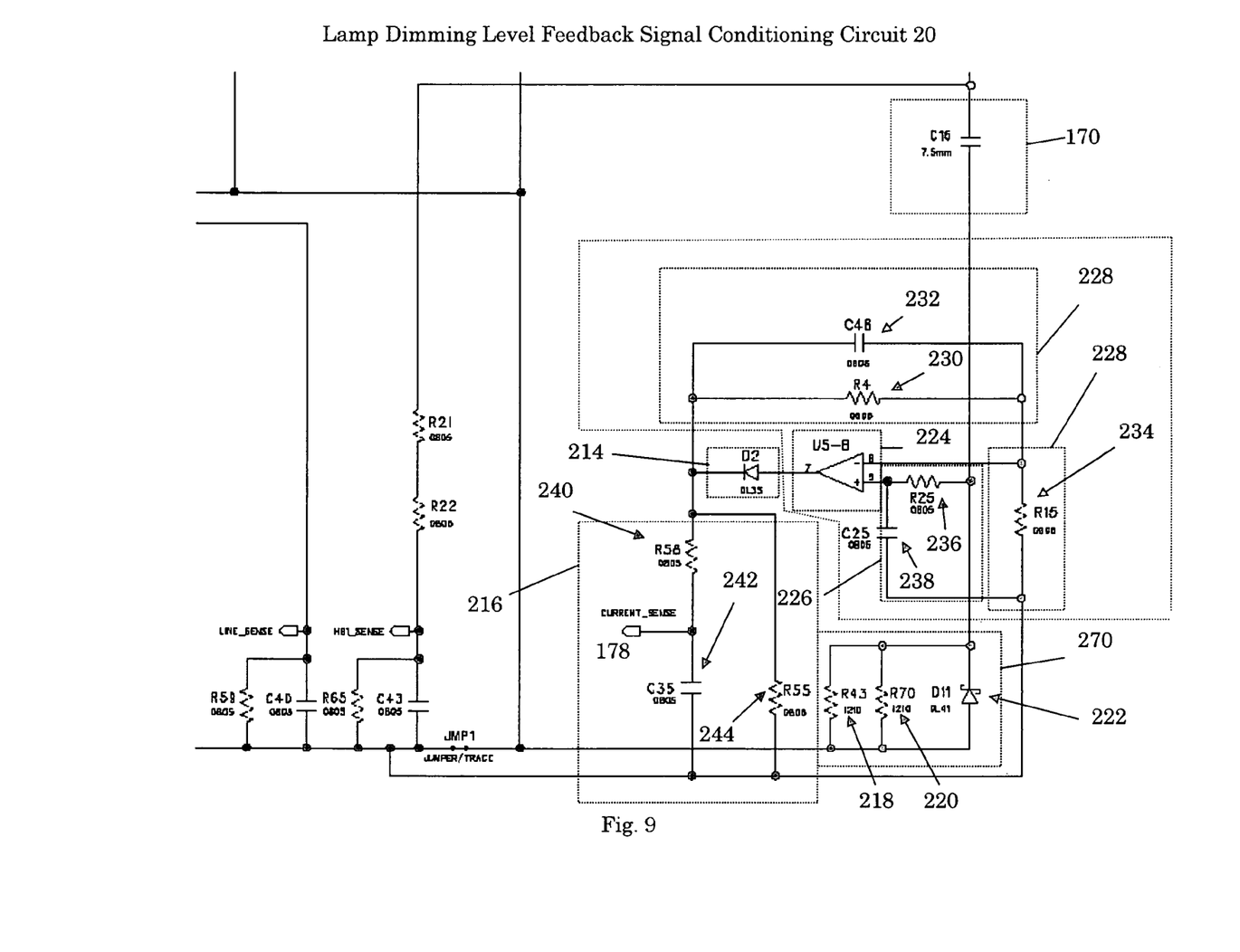
FIG. 9 is a schematic showing an enlarged view of the preferred embodiment of the lamp dimming level feedback signal conditioning circuit.

Referring to FIG. 9, the lamp dimming level feedback signal conditioning circuit 20 (the "feedback signal conditioning circuit 20") is designed to be connected to the inverter circuit 18, to receive an AC lamp current feedback signal from the inverter circuit 18 that is proportional to AC current flowing through the lamp 112, and to convert that AC lamp current feedback signal into the analog DC voltage feedback signal 178 that is supplied to the microcontroller circuit 22. More specifically, the feedback signal conditioning circuit 20 converts the AC lamp current feedback signal into an AC voltage signal, limits that AC voltage signal to a predetermined AC voltage level to generate a limited AC voltage, rectifies that limited AC voltage to generate a rectified DC voltage, filters that rectified DC voltage to obtain a filtered DC voltage, amplifies the filtered DC voltage to generate an amplified DC voltage, rectifies the amplified DC voltage to eliminate negative going transients, and filters the rectified and amplified DC voltage to generate the analog DC voltage feedback signal 178.

To implement these functions, the feedback signal conditioning circuit 20 includes a voltage generating circuit 210, an amplifying circuit 212 connected to the voltage generating circuit 210, a rectifying circuit 214 connected to the amplifying circuit 212, and an output filter circuit 216 connected to the rectifying circuit 214.

As shown in FIG. 9, the voltage generating circuit 210 includes a pair of resistors, 218 and 220, connected in parallel with one another and a Zener diode 222 connected in parallel with the resistors. The resistors, 218 and 220, convert AC lamp current from the inverter circuit 18 into AC voltage, and the Zener diode 222 rectifies the AC voltage to generate a DC voltage and limits the DC voltage to the breakdown voltage of the Zener diode 222.

To reduce the amount of power dissipated, the resistors, 218 and 220, are sized so that they have as little resistance as possible and are still able to generate an AC voltage suitable for use by the amplifying circuit 212. In addition, the breakdown voltage of the Zener diode 222 is selected so that the DC voltage applied to the amplifying circuit 212 does not exceed the input voltage limitations of that circuit.

The amplifying circuit 212 includes an operational amplifier 224, an amplifier input filter 226, and an amplifier gain circuit 228. In FIG. 9, the operational amplifier 224 is a conventional operational amplifier and includes an inverting input, a noninverting input, and an amplifier output. In combination with the amplifier gain circuit 228, the operational amplifier 224 amplifies the DC voltage signal generated by the voltage generating circuit 210 so that it can be applied to the microcontroller circuit 22.

The amplifier gain circuit 228 includes a gain resistor 232 and gain capacitor 234 connected in parallel with one another and connected to the inverting input and the output of the amplifier 224. These two components determine, in part, the gain of the operational amplifier 224. Amplifier gain is also determined, in part, by a second gain resistor 234 connected to the inverting and noninverting inputs of the operational amplifier 224 as shown in FIG. 9.

The amplifier input filter 226 is connected to the inverting input of the operational amplifier 224 and is a low pass input filter designed to filter out high frequency noise that may be present in the DC voltage generated by the voltage generating circuit 210. The amplifier input filter 226 includes an input filter resistor 236 connected to an input filter capacitor 238.

The rectifying circuit 214 shown in FIG. 9 is a conventional diode 214 that simply rectifies the output of the amplifying circuit 212 to generate a rectified DC voltage. The output filter circuit 216 is a low pass filter circuit designed to filter out high frequency noise that may be present in the rectified DC voltage generated by the rectifying circuit 214 and includes an output filter resistor 240 connected in series with an output filter capacitor 242. The output filter circuit 216 also includes a second output filter resistor 244 that is used to discharge the output filter capacitor 242 when the voltage applied to the output filter circuit 216 drops to zero.

Alternative Embodiments of the Present Invention

The software dimming ballast 10 of the present invention may vary in a number of different ways. For example, the software dimming ballast 10 as described above may be connected to a DC power source rather than the AC power source 26. Alternatively, the converter circuit 14 and the PFC circuit 16 in the above-referenced embodiment can be eliminated entirely and this modified version of the software dimming ballast 10 can be connected to the DC power source.

The 60 Hz AC power source 26 may be replaced with a 50 Hz AC power source in another embodiment. In that embodiment, the various circuit components included in the software dimming ballast 10 are designed to receive 50 Hz AC power rather than 60 Hz AC power.

In other embodiments, the EMI filter and the PFC circuits may both be excluded from the software dimming ballast 10 of the present invention. This is true regardless of whether an AC power source or a DC power source is to be connected to the software dimming ballast 10. If there is very little noise present in the software dimming ballast 10, or the noise is at a tolerable level for a certain application, the EMI filter circuit 12 may be excluded. Also, if power factor correction is not an issue and the DC power generated by the converter circuit 14 or a DC power source is sufficiently high, the PFC circuit may be excluded.

In still other embodiments, a variety of different types of EMI filter and PFC circuits may be used with the present invention. The prior art includes EMI filter circuits that have different filtering capabilities and any one of these filters may be used with embodiments of the present invention.

Similarly, the prior art includes a variety of different types of PFC circuits. For example, the prior art includes PFC circuits that provide power factors that are less than 0.95. In addition, the prior art includes PFC circuits that do not generate a boosted DC voltage at all or generate a boosted DC voltage that has a magnitude that is less than 450 volts. Other PFC circuits use different PFC ICs and have switching frequencies that are higher or lower than the 10-15 kHz switching frequency discussed above. Any one of these PFC circuits may be used in embodiments of the present invention.

AC/DC converter circuits are well known in the art and any one of a variety of different types of converters may be used in embodiments of the present invention. For example, the prior art includes single diode converters and half-bridge converters. Embodiments of the present invention may include either of these types of converters. Still other embodiments may include regulator circuits that include different regulator ICs.

The inverter circuit 18 used in the present invention may also vary. For example, the inverter circuit 18 may include a full bridge transistor switching circuit or a push pull transistor switching circuit. In addition, the inverter circuit 18 may include a parallel resonant LC output circuit rather than the series resonant LC output circuit discussed above. The inverter circuit 18 may use BJT or MOSFET power transistors.

The inverter circuit 18 may output AC output voltages having a variety of different frequencies in order to preheat and strike the lamp 112. The magnitude of the AC output voltages may be higher or lower than the 450 volt AC output voltage discussed previously. The inverter circuit 18 may include different inverter ICs, different microcontroller ICs, or both. The control software may be designed to cause the microcontroller IC 172 to vary the frequency of the pulse width modulated inverter control signals in order to control lamp dimming rather than varying the duty cycle of the inverter control signals. The control software may also be designed to generate inverter control signals having varying duty cycles and frequencies in order to control lamp dimming.

The control software may be modified so that it does not process the line voltage and HB capacitor feedback signals and shut down the software dimming ballast 10 when these signals indicate that the line voltage is too low or the lamp 112 has reached an end of lamp life condition. The microcontroller IC 172 may be designed to receive and process digital dimming control signals that have a variety of different digital protocols. The software dimming ballast 10 may also include an analog dimming signal conditioning circuit 20 that can be used to convert a 0-10 volt analog dimming control signal generated by a conventional 0-10 volt dimming control device into a 0-5 volt analog dimming control signal required by the microcontroller IC.

The feedback signal conditioning circuit 20 may also vary from one embodiment to another. For example, the feedback signal conditioning circuit 20 may be modified so that it does not limit the AC voltage generated by this circuit, filter the rectified DC voltage generated by this circuit, amplify the filtered DC voltage generated by this circuit, rectify the amplified DC voltage signal generated by this circuit, or so that it does not filter the rectified and amplified DC voltage signal generated by this circuit. In addition, the amplifier gain circuit may be modified so that it can be adjusted by the control software so that the gain of the amplifier is dependent upon the magnitude of the rectified DC voltage applied to the amplifier. If the DC voltage drops down to a predetermined level, the gain can be increased. In a similar manner, if the DC voltage increases to a predetermined level, the gain can be decreased.

Thus, although there have been described particular embodiments of the present invention of a new and useful Software Controlled Electronic Dimming Ballast, it is not intended that such references be construed as limitations upon the scope of this invention except as set forth in the following claims.

The invention claimed is:

1. An electronic dimming ballast comprising:
   an inverter circuit for supplying current to a lamp; and
   a dimming control circuit comprising a controller circuit, a dimming control signal input that receives a dimming control signal representative of the desired lamp dimming level, a lamp dimming level feedback signal input that receives a lamp dimming level feedback signal representative of an existing lamp dimming level, and an inverter control signal output that outputs an inverter control signal having a pulse width and frequency that causes the inverter circuit to supply the lamp with sufficient current to cause the lamp to have a desired lamp dimming level;
   the controller circuit comprising lamp dimming level control software functional to cause the dimming control circuit to incrementally modulate the pulse width and frequency of the inverter control signal based on the dimming control signal and the lamp dimming level feedback signal.

2. The dimming ballast of claim 1, wherein:
   the dimming control circuit is functional to convert the dimming control signal into desired dimming level digital data representative of the desired lamp dimming level;
   the dimming control circuit is functional to convert the lamp dimming level feedback signal into existing lamp dimming level digital data representative of the existing lamp dimming level; and
   the controller circuit and lamp dimming level control software are functional to cause the dimming control circuit to generate the inverter control signal based on the desired dimming level digital data and the existing lamp dimming level digital data.

3. The dimming ballast of claim 2, wherein:
   the controller circuit and lamp dimming level control software are functional to cause the dimming control circuit to generate error digital data based on the desired dimming level digital data and the existing lamp dimming level digital data; and the controller circuit and lamp dimming level control software are functional to cause the dimming control circuit to generate the inverter control signal based on the error digital data.

4. The dimming ballast of claim 3, wherein:

the controller circuit and lamp dimming level control software are functional to cause the dimming control circuit to use the error digital data to identify inverter control signal digital data; and the controller circuit and lamp dimming level control software are functional to cause the dimming control circuit to generate the inverter control signal based on the inverter control signal digital data.

5. The dimming ballast of claim 1, wherein:

the dimming control signal is an analog dimming control signal;

the dimming control circuit is functional to convert the analog dimming control signal into desired lamp dimming level digital data representative of the desired lamp dimming level; and the controller circuit and lamp dimming level control software are functional to cause the dimming control circuit to generate the inverter control signal based on the desired lamp dimming level digital data.

6. The dimming ballast of claim 1, wherein:

the dimming control signal is a digital dimming control signal;

the controller circuit and lamp dimming level control software are functional to cause the dimming control circuit to convert the digital dimming control signal into desired lamp dimming level digital data representative of the desired lamp dimming level; and the controller circuit and lamp dimming level control software are functional to cause the dimming control circuit to generate the inverter control signal based on the desired lamp dimming level digital data.

7. The dimming ballast of claim 1, wherein:

the lamp dimming level feedback signal is an analog lamp dimming level feedback signal;

the dimming control circuit converts the analog lamp dimming level feedback signal into existing lamp dimming level digital data representative of the existing lamp dimming level; and the controller circuit and lamp dimming level control software are functional to cause the dimming control circuit to generate the inverter control signal based on the existing lamp dimming level digital data.

8. The dimming ballast of claim 1, wherein:

the inverter control signal is a pulse width modulated inverter control signal; and the controller circuit and lamp dimming level control software are functional to cause the dimming control circuit to generate the pulse width modulated inverter control signal.

9. The dimming ballast of claim 1, wherein:

the inverter control signal is a frequency modulated inverter control signal; and the controller circuit and lamp dimming level control software are functional to cause the dimming control circuit to generate the frequency modulated inverter control signal.

10. The dimming ballast of claim 1, wherein the dimming control circuit further includes:

an input voltage feedback input that receives an input voltage feedback signal representative of input voltage being supplied to the dimming ballast; and line voltage control software functional in cooperation with the controller circuit to cause the dimming control circuit to shut down the inverter circuit if the input voltage feedback signal indicates that the input voltage has fallen below a minimum input voltage level.

11. The dimming ballast of claim 10, wherein the dimming control circuit further includes an input voltage feedback signal conditioning circuit functional to generate the input voltage feedback signal.

12. The dimming ballast of claim 11, wherein the input voltage feedback signal conditioning circuit comprises an input voltage feedback signal resistor connected in parallel with an input voltage feedback signal capacitor.

13. The dimming ballast of claim 1, wherein the dimming control circuit further comprises:

a lamp condition feedback input that receives a lamp condition feedback signal representative of lamp condition; and lamp condition control software functional in cooperation with the controller circuit to cause the dimming control circuit to shut down the inverter circuit if the lamp condition feedback signal indicates that the lamp has reached an end of lamp life condition.

14. The dimming ballast of claim 13, wherein the dimming control circuit further comprises a lamp condition feedback signal conditioning circuit functional to generate the lamp condition feedback signal.

15. The dimming ballast of claim 14, wherein the lamp condition feedback signal conditioning circuit comprises a lamp condition feedback signal resistor connected in parallel with a lamp condition feedback signal capacitor.

* * * * *